United States Patent [19]

Lenz

[11] 3,737,788

[45] June 5, 1973

[54] SLOPE RESPONSIVE SIGNAL IDENTIFICATION MEANS

[75] Inventor: Charles E. Lenz, Fullerton, Calif.

[73] Assignee: North American Rockwell Corporation, El Segundo, Calif.

[22] Filed: Apr. 16, 1970

[21] Appl. No.: 29,221

Related U.S. Application Data

[63] Continuation-in-part of Ser. No. 463,090, June 11, 1965, Pat. No. 3,508,246.

[52] U.S. Cl. ....................328/118, 328/114, 307/215

[51] Int. Cl......H03k 5/20, H03k 19/00, H03k 19/36

[58] Field of Search ................340/347 AD, 347 DD; 179/15; 307/247, 215; 328/114, 118

[56] References Cited

UNITED STATES PATENTS

| | | | |
|---|---|---|---|
| 2,965,891 | 12/1960 | Martin | 340/347 AD |
| 3,541,546 | 11/1970 | French | 340/347 AD |
| 3,564,538 | 2/1971 | Bondzeit et al. | 340/347 AD |
| 3,508,246 | 4/1970 | Lenz | 340/347 AD |

*Primary Examiner*—Maynard R. Wilbur
*Assistant Examiner*—Thomas J. Sloyan
*Attorney*—L. Lee Humphries, H. Fredrick Hamann, Edward Dugas and Martin E. Gerry

[57] ABSTRACT

A slope responsive signal identification means which is excited by at least one input signal. The system has a circuit for quantizing the input signal, which quantizer provides a binary output. There is also available a clock pulse supply source the output of which together with the output of the quantizer is fed to a memorizer circuit which provides memorization of the state of logic of the binary output. Additionally a circuit responsive to the memorizer and clock pulse supply source is provided for identification of the slope polarity of the input signal.

9 Claims, 3 Drawing Figures

Patented June 5, 1973 3,737,788

3 Sheets-Sheet 1

INVENTOR
CHARLES E. LENZ
BY Martin E. Gerry
AGENT

Patented June 5, 1973

3,737,788

3 Sheets-Sheet 2

INVENTOR.
CHARLES E. LENZ

BY Martin E. Berry
AGENT

Patented June 5, 1973

3,737,788

3 Sheets-Sheet 3

INVENTOR.
CHARLES E. LENZ
BY Martin E. Gerry
AGENT

SLOPE RESPONSIVE SIGNAL IDENTIFICATION MEANS

PARENT APPLICATION

This application is a continuation-in-part of application Ser. No. 463,090, filed June 11, 1965, now Pat. No. 3,508,246.

BACKGROUND OF THE INVENTION

1. Field of Invention

This invention relates to a unique digital detector of signal variations having adjustable predetermined level inputs. Such detector can indicate both level crossing and the direction in which the level is traversed, all without the significant limitations encountered in performing such functions.

2. Prior Art

Earlier devices related to this field of invention are exemplified by U.S. Pat. No. 2,552,968 issued May 15, 1951 for a Random Pulse Synchronizer. However, this invention to obtain bipolar operation required two separate implementations in conjunction with an input inverter and additional gating circuitry, leading to higher costs, larger size, and lower reliability than the invention disclosed here.

Another result obtained by the prior art is a device responsive to the slope polarity of an input signal at the time a predetermined reference level is crossed with need for a second input signal (commonly a facsimile of the first input signal either in quadrature with or otherwise displaced from the first input signal) required by certain other devices. U.S. Pat. No. 3,218,911 for a Photoelectric Gauge Employing a Plurality of Gratings, issued Nov. 23, 1965 and U.S. Pat. No. 2,947,929 for a Digital-Analog Servo Circuit, issued Aug. 2, 1960; U.S. Pat. No. 2,537,427 for a Digital Servo, issued Jan. 9, 1951; and U.S. Pat. No. 2,886,717 for a Measuring Apparatus, issued May 12, 1959, are examples of such other results obtained.

SUMMARY OF THE INVENTION

Objects of the Invention

The basic purpose of this invention is to provide means for synchronously indicating—by generation of untruncated output pulses—each crossing (of a predetermined reference level) by an arbitrary input signal, along with the direction of each such traversal.

Accordingly, an object of this invention is to provide a reference signal level, adjustable if required.

Another object of this invention is to accept an arbitrary input which is a continuously varying analog, asynchronous discrete, or arbitrarily synchronized discrete signal to whose crossings of the reference level the invention is responsive.

A further object of this invention is to accept as inputs one or more synchronization signal(s) provided by a single-pulse or multiphase clock-signal generator.

An additional object of this invention is to provide means for promptly transmitting from a first output a pulse selectd from a specified clock signal whenever the arbitrary input signal increases through or to the reference level and then remains at or above that level for at least a specified minimum interval of time.

One other object of this invention is to provide means for promptly transmitting from a second output a pulse selected from a specified clock signal whenever the arbitrary input signal decreases through or from the reference level and then remains below that level for at least a specified minimum interval of time.

Still another object of this invention is to provide means for promptly transmitting from a third output a pulse selected from a specified clock signal whenever the arbitrary input signal either (1) increases through or to the reference level and then remains at no less than that level for at least a specified interval of time or (2) decreases through or from the reference level and then remains below that level for at least a specified interval of time.

One more object of this invention is to assure that no truncation or significant delay occurs of any clock pulse transmitted from any output.

Yet another object of this invention is to permit generation of any of the outputs specified in any combination, either with or without any of the remaining outputs, in order to most economically satisfy the requirements of a given application.

In general terms, this invention results in the capability of performing certain interface operations indispensable in converting information to a form suitable for processing by a digital computer or other synchronous digital means in a manner which provides a combination of advantages not previously available. Such conversion is essential because the input signal to be processed may be incompatible with available synchronous digital processing means in several ways. For example, the input signal may be analog, instead of discrete and binary as commonly required by digital computers. Even if discrete binary, however, the input signal may still be either asynchronous, unsuitably synchronized, or varying between the wrong levels. This invention can eliminate any combination of such types of incompatibility. More specific results and advantages of the slope-sensitive digital level-crossing detector are described below.

A result of this invention is a single design which can serve three purposes: detection of crossings of a reference level by an arbitrary input signal (1) only when the signal's slope is positive, (2) only when the signal's slope is negative, or (3) when the signal's slope is either positive or negative. Indeed, a single implementation of the invention can yield any two of the above results, or even all three. Thus the versatility of the invention permits economy by design standardization and elimination of alternative designs. An associated advantage is that the complexity of implementation is far less than proportional to the number of the above results obtained. The bipolar-slope capability which the invention provides is a fundamental advantage over earlier devices. An attendant advantage is that the design of the equipment supplying the input to a level detector is greatly simplified when only a single input signal is required. Inspection of the references just cited will demonstrate that the economy contributed by this feature alone of the invention disclosed here is considerable.

One other result of this invention is provision of a detection or reference level which is continuously variable to any predetermined value within a broad interval. Two advantages of this feature are that it facilitates adjustment of any system in which the invention is a component and that it increases the range of application of any particular implementation of the invention.

An additional result of this invention is a level detector which functions in a manner independent of the average value and range of the arbitrary input signal. An advantage of this feature is that it yields a single versatile device with a far greater range of applicability without design modification than is possible with any partially comparable device whose operation is more dependent upon the characteristics of the input.

Still another result of this invention is a level detector which can detect the level crossings of an arbitrary input signal regardless of the absolute value of the slope of that signal at the instant when a level crossing occurs. A concomitant advantage is a device responsive both to discrete pulse inputs and to continuously varying analog inputs. Typical synchronizing devices are designed principally for discrete pulse inputs and are either less dependable or unresponsive with more slowly varying analog inputs.

A further result of this invention is the ability to operate with either a single-phase or multiphase clock signal. An accompanying advantage is a much wider field of application than possible with a device having more critical clock-signal requirements. One earlier partially comparable device, for example, is operative only with a multiphase clock, which must be provided even if no associated equipment requires such a clock.

Yet another result of this invention is a set of outputs which are not only discrete, but which are each synchronized to an appropriate clock signal. A relevant advantage is a set of outputs fully compatible with utilization of standard synchronous digital processing techniques in subsequent equipment, thereby avoiding the complexity of either asynchronous processing or synchronization later.

One more result of this invention is a set of outputs which can be actual facsimiles of pulses selected from the clock-pulse train(s) utilized for synchronization, generated with insignificant delay. A germane advantage is that any output of the level detector can be used to gate clock pulses without truncation and is completely suitable as an input for a general- or special-purpose digital computer without further processing. This advantage results because the invention is completely in the steady state immediately before each output pulse is generated and merely transmits each clock pulse selected for an output signal through an appropriately enabled gate or gates. By contrast, in an earlier partially comparable device each output pulse is delayed by an indeterminate amount from the clock pulse initiating it, due to the sequence of operations through which components of that device must pass immediately before each output pulse can be generated.

Quite another result of this invention is that truncation of the selected clock pulses which constitute each output is completely avoided. A related advantage is the fully dependable response of subsequent digital equipment to the outputs of this invention which is possible without further precautions against truncation.

A concurrent result of this invention is a device composed entirely of standard digital circuits; a trigger, flipflops, gates, and logical inverters (which may themselves be gates utilizing a single input). Consequent advantages are simplified construction and straightforward microminiaturization.

Even another result of this invention is a device which functions without monostable components. A correlative advantage is avoidance of the relatively high sensitivity of monostable multivibrators to noise and environmental effects such as temperature variation. In addition, microminiaturization of the level detector is thus simplified.

In conjunction with other equipment, the invention is useful in a broad class of frequently encountered applications, of which the following are typical: (1) digital measurement of the frequency of a periodic analog or digital signal, (2) analog-to-digital conversion of a signal level to a discrete synchronized time interval, (3) digital measurement of the phase of a periodic analog or digital signal, (4) synchronization of either an asynchronous or arbitrarily synchronized digital signal to permit processing by an associated digital computer or other digital equipment, (5) digital measurement of the period of an analog or digital signal, (6) digital measurement of doppler shift, (7) digital measurement of range by laser or monopulse radar means, (8) digital measurement of navigational position by loran means, (9) digital measurement of angular or linear position as a component of a phase-shift transducer used, for example, in a numerically controlled machine tool, and (10) digital frequency or phase demodulation. First conceived and reduced to practice for use in an astrotracker of arc-second resolution for Model N-16-S autonavigator.

The above uses are equally applicable in the construction of radar sets, frequency meters, phase meters, analog-to-digital converters, communication and control demodulators, and numerically controlled machine tools, for example. This invention is free of former limitations such as (1) the need for quadrature or other supplementary input signals which are often expensive and either difficult or even impossible to derive, (2) design features not readily adaptable to microminiaturization, (3) sensitivity to level crossings occurring only when the input slope is of a single polarity, (4) the need for design modification to detect level crossings which occur with input slopes of different polarities, (5) sensitivity to the average value of the input signal, (6) sensitivity to the absolute value of the slope of the input signal, (7) utility with only a digital or an analog input, but not with both, (8) undesirable and erratic serial time delays in the generation of synchronous output signals, (9) drift-prone and noise-sensitive monostable components, (10) truncation of output pulses, leading to undependable operation of subsequent equipment, (11) the need for manual resetting after each level crossing detected, (12) the need for a multiphase clock, even when a single-phase clock is adequate for all associated equipment, and (13) asynchronous output requiring further processing for compatibility with subsequent digital processing equipment.

Inventive Summary

The inventive system excited by at least one input signal of a slope responsive signal identification means comprises in combination, a first means for quantizing said at at least one input signal and providing at least one binary output therefrom. The system also comprises a second means for providing at least one clock pulse therefrom. Also provided is a third means responsive to the first and second means for providing memorization of the state of logic of said at least one binary output. Finally, a fourth means which is responsive to the second and third means is provided for identification of the slope polarity of said at least one input signal.

Hence, the first means is a quantizer which provides at least one binary signal output converted from at least one arbitrary input signal. The second means is a clock pulse means for providing an output of at least one of a plurality of clock pulses. The third means is a signal-state-memory means which is responsive to the outputs of the quantizer and the clock-pulse means for remembering and providing an output thereof of at least a first component of the binary signal occurring in time between the trailing edge of one of the clock pulses last inputted and the trailing edge of one of the clock pulses occurring prior to the last clock pulse, and a second component of the binary signal occurring in time between the trailing edge of the prior clock pulse and the trailing edge of the clock pulse preceding the prior clock pulse. The fourth means is a slope polarity means which is responsive to the output of the signal-state-memory means and the clock pulse means for comparing the first and second components and for recognizing such of the first and second components which have different binary logic states, and identifying the slope polarity of said at least one arbitrary input signal.

Briefly, it may be stated that the system is excited by at least one input signal and functions in accordance with the following sequence of events according to the process steps of: (1) quantizing said at least one input signal for providing at least one binary output; (2) memorizing the logic state of said at least one binary output; and (3) identifying the positive and negative slope polarities of said at least one input signal.

It follows therefore, that as hereinabove stated, the last of the components so recognized may be recognized as having a true and/or a false logic state. Also, identification of the slope polarity in this invention is independent of the slope polarity in this invention is independent of the magnitudes and polarities of the input signal. The system is also insensitive to both the sense as well as the average of the algebraic magnitude of the input signal. This apparatus also provides outputs from its fourth means which are untruncated. The fourth means also provides outputs which have substantially the same slope as said at least one clock pulse and are synchronized therewith.

Additionally, the first means has an output which is responsive to the difference in amplitude between an arbitrary input signal of said at least one input signal and a reference signal inputted to the first means. In many instances it will be desirable to use an input signal which has binary characteristics. Therefore, the binary input signal to the first means may vary between two arbitrary levels for providing a corresponding binary output from the first means which varies between predetermined levels, but nevertheless enables the fourth means to identify the slope polarity of the binary input signal. The binary input signal may vary arbitrarily with time but nevertheless enables the fourth means to still identify the slope polarity thereof.

EXEMPLARY EMBODIMENT

Basic Components

Figure 1:
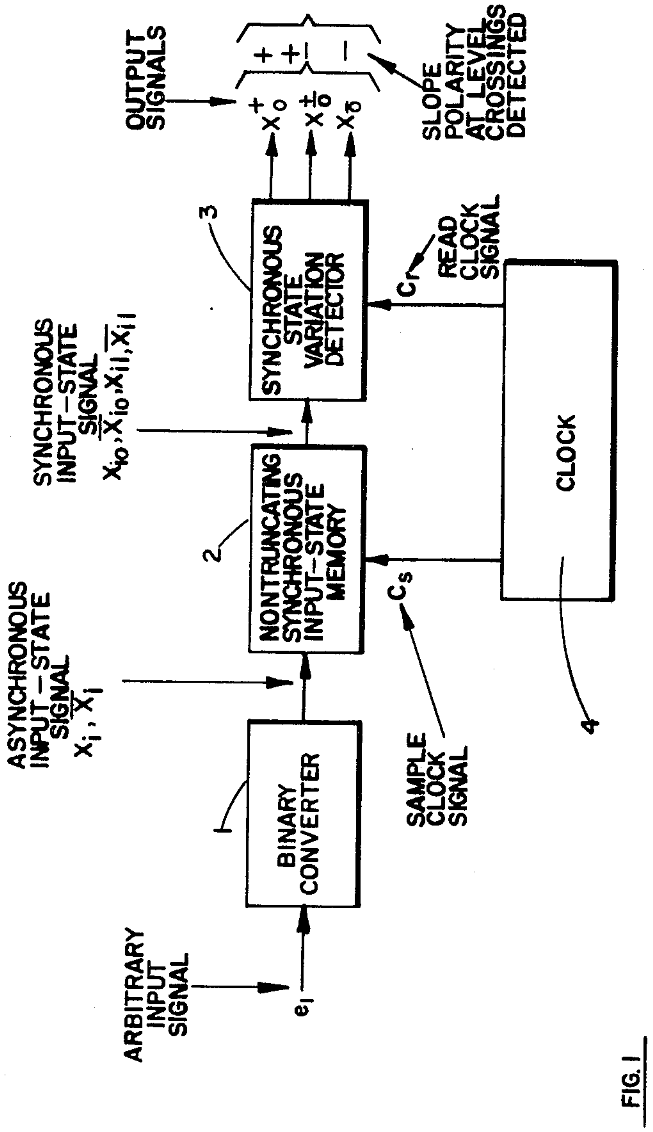
FIG. 1 is a block schematic diagram showing the relationship between a binary quantizer, a clock pulse generator, a nontruncating synchronous input-state memory circuit, and a synchronous state-variation slope responsive signal identification means.
Figure 2:
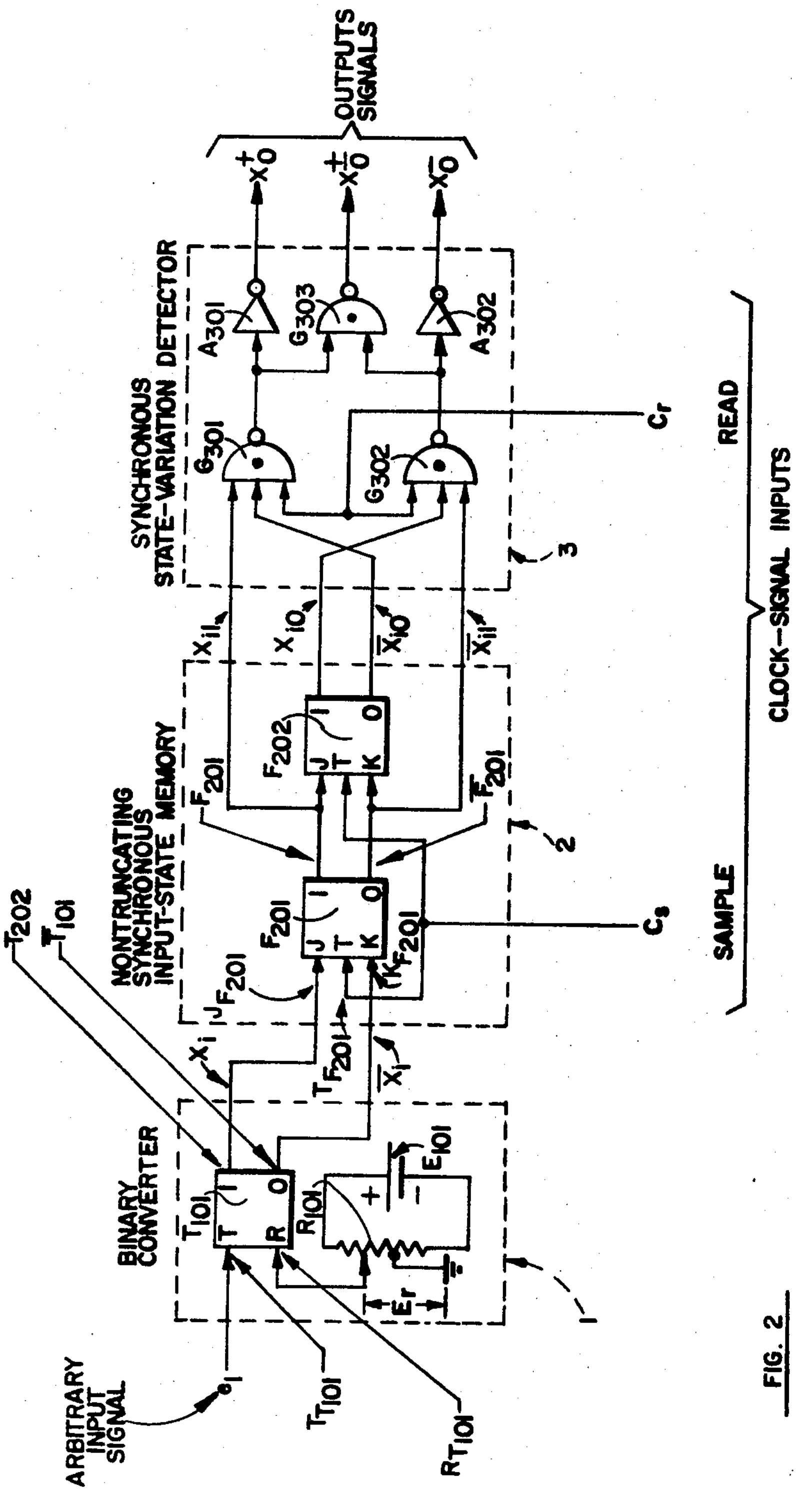
FIG. 2 is a more detailed schematic of FIG. 1 showing in semi-block and symbolic logic the circuitry of all components except the clock pulse generator.
Figure 3:
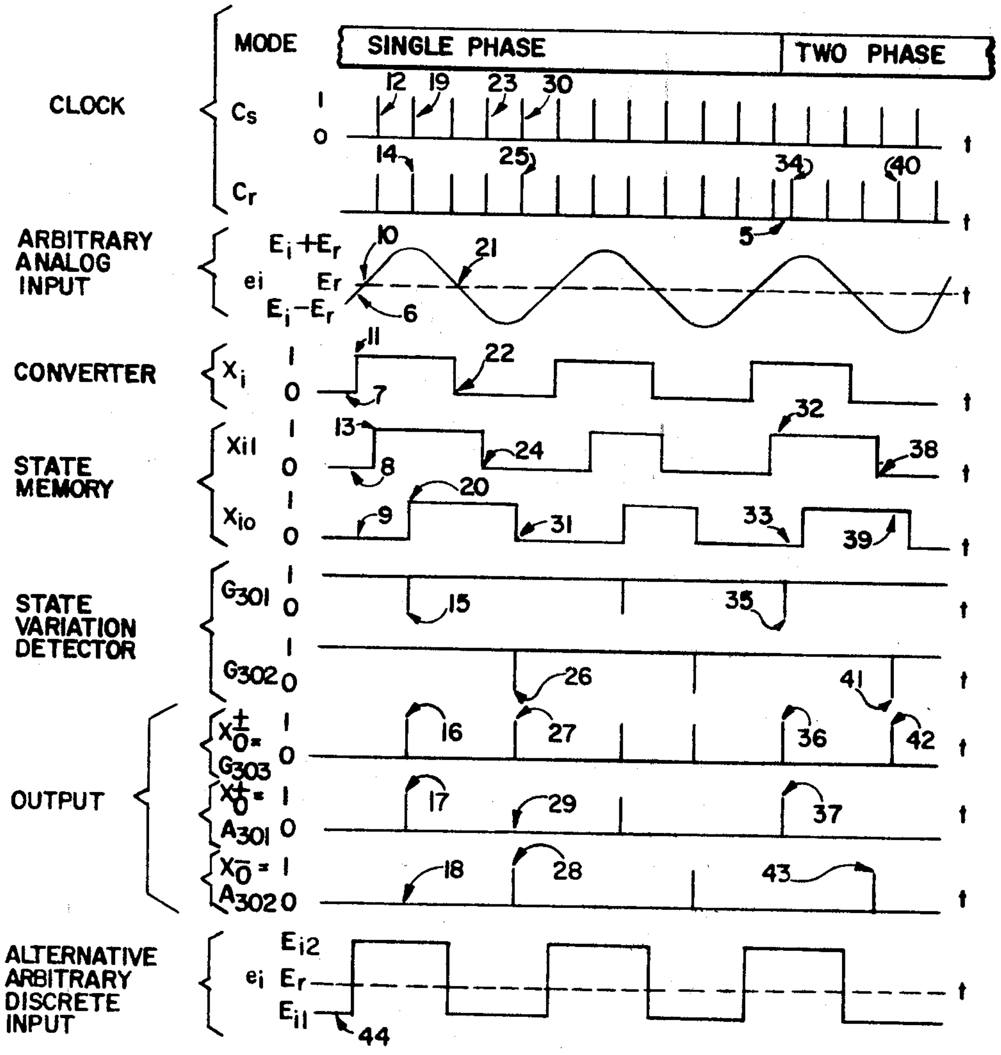
FIG. 3 is a waveform illustration of the signal relationships occurring in the inventive system.

Referring to FIGS. 1, 2 and 3, the basic components of the invention are a binary converter 1, a nontruncating synchronous input-state memory 2, a synchronous state-variation detector 3, and a clock 4. State memory 2 and variation detector 3 are both synchronized in their operation by clock 4, which may be of either single- or multiple-phase design.

All signals received or generated by the above components are discrete binary except for the arbitrary input signal $e_i(t)$, which may be either discrete or continuously varying, where $t$ = elapsed time.

The following conventions relating to signal definition will be employed in this invention disclosure. It is common practice to somewhat loosely denote as a "discrete voltage" (or as some other discrete physical variable) one which can exist only in a set of two or more noncontiguous permissible ranges, except during infinitesimal periods of time necessary for transition between such ranges. One-to-one correspondence may be defined between each of these ranges and a different "state"—each representable by a separate, arbitrarily chosen symbol—of a logical variable or signal. Strictly speaking, it is this logical signal, rather than the corresponding physical variable, which is actually discrete in value. It is an implicit quality of any physical variable denoted as discrete and utilized for communication that all information conveyed by the knowledge that it is at a specific level at a given instant is also conveyed without degradation by the knowledge that the corresponding logical signal is in a specific state at that same instant. Thus, the state of the logical signal can be plotted as a function of time in lieu of the value of the corresponding physical variable without loss of essential information. To so do has the advantage of permitting the information transmitted to be represented precisely without confining associated equipment design to a specific physical means for transmitting that information. In the case where only two states are possible, it is common to arbitrarily denote these states by the integers 0 and 1; here arbitrarily signifies that it is completely optional whether or not the state denoted by 1 corresponds to that range of the appropriate physical variable wherein all values are greater than all values in the range corresponding to the state denoted by 0. The actual definition as to which range of a physical variable corresponds to a specific logical state is normally based upon overall mathematical convenience. In delineating between only two possible states, it is common to refer alternatively to that denoted by 1 as the "true state" and to that denoted by 0 as the "false state." A logical signal may then be said to "go true" when passing through a 0-to-1 transition and to "go false" when varying in the opposite direction. Usually there is one specific state in which any given binary logical signal will remain until called upon to perform or to prepare for its intended function, and it is common— but not essential—for the signal to remain in this "normal" state most of the time. To identify the state which is normal for it, a signal may be called "normally true" or "normally false." When only two states are possible, it is also common to refer, sometimes in a contracted manner, to a "binary logical signal" and, somewhat more loosely, to a corresponding "discrete binary physical variable" (that is, to a "discrete binary voltage," for example). In this invention disclosure, it is the preceding two-state case which is of specific interest. Reference will invariably be made to a binary logical signal, rather than to the corresponding physical variable. Such binary signals will be denoted by specified upper-case letters, normally with associated subscripts, possibly with superscripts, and either with or without arguments indicating functional dependence. A typical example is X $_o(t)$ or, identically, X $_o$.

Overall Function of the Invention

The overall function of the invention is to generate three output signals—$X^+_o(t)$, $X^-_o(t)$, and X $_o(t)$—two of which will respond to each crossing of a fixed reference level $E_r$ by $e_i(t)$ in the following manner:

1. On each occasion when $e_i(t)$ increases through or to $E_r$ and remains above or at $E_r$ for a brief predetermined period, a selected pulse of a train generated by clock 4 is promptly emitted at $X^+_o(t)$ and X $_o(t)$.
2. On each occasion when $e_i(t)$ decreases through $E_r$ and remains below $E_r$ for a brief predetermined period, a selected pulse of a train generated by clock 4 is promptly emitted at $X^-_o(t)$ and X $_o(t)$.

It is thus clear that $X^+_o(t)$ is responsive to positive-slope level crossings by $e_i(t)$, that $X^-_o(t)$ is responsive to negative-slope level crossings by $e_i(t)$, and that X $21_o(t)$ is responsive to all level crossings by $e_i(t)$, where the level to which reference is made in each case is $E_r$.

Functions of Components

The function of clock 4 will be described first because of the extent to which its outputs affect the operation of other components. Clock 4 generates these outputs:

$C_s(t)$ = a "sample" clock signal, and $C_r(t)$ = a "read" clock signal which is identical to $C_s(t)$ except possibly in respect to time displacement, depending upon the application of the invention.

Both $C_r(t)$ and $C_s(t)$ are normally false, periodic pulse trains of period $\tau$, of pulse length $\tau_c$, and of relatively low duty cycle, typically ¼. However, during the pulse both $C_r(t)$ and $C_s(t)$ must remain true for an interval no less than $\tau_e$, where $\tau_e$ = the enabling time of the flip-flops employed in implementation of the invention.

Now $$C_r(t) = C_s(t),\ \text{if clock 4 is single phase.} \tag{1}$$

Otherwise, typically $$C_r(t) = C_s[t + (\tau/2)],\ \text{if clock 4 is two phase.} \tag{2}$$

During the first pulse of a specified clock train to occur during the interval wherein $t > 0$, $C_r(t)$ is last true when $t = (\tau/2)$, and $C_s(t)$ is last true when $t = \tau$. The two clock signals satisfy the logical relationship $$C_r(t)C_s(t) = 0. \tag{3}$$

A period of either clock signal $C_r(t)$ or $C_s(t)$ is bounded by the trailing edges of adjacent clock pulses in the train under consideration.

The function of the binary converter 1 is to transform arbitrary input signal $e_i(t)$ into a pair of complementary asynchronous input-state signals, $X_i(t)$ and $\overline{X}_i(t)$, in such a manner that $$X_i(t) = \begin{cases} 1,\ e_i(t) \geq E_r, & (4a) \\ 0,\ e_i(t) < E_r. & (4b) \end{cases}$$

The signal $X_i(t)$ thus indicates by its logical value the instantaneous polarity of the difference $e_i(t) - E_r$.

In addition to the clock signal $C_s(t)$, the state memory 2 requires $X_i(t)$ and $\overline{X}_i(t)$ as inputs. These input signals are transformed into two pairs of complementary outputs, namely: (1) $X_{i0}(t)$ and $\overline{X}_{i0}(t)$ and (2) $X_{i1}(t)$ and $\overline{X}_{i1}(t)$. These outputs can vary only in synchronization with a specified variation of $C_s(t)$, typically the trailing edge (that is, 1-to-0 transition) of a clock pulse. More specifically:

1. Signal $X_{i1}(t)$ always assumes the same logical value as $X_i(t)$ in response to the first 1-to-0 transition of $C_s(t)$ no less than an interval $\tau_e$ after $X_i(t)$ changes state, providing that $X_i(t)$ does not again change state until that transition of $C_s(t)$ occurs. Signal $X_{i1}(t)$ then remains in the same state until $X_i(t)$ again changes state in the manner just described.
2. Signal $X_{i0}(t)$ always assumes the same logical value as $X_{i1}(t)$ in response to the first 1-to-0 transition of $C_s(t)$ occurring after $X_{i1}(t)$ changes state. Signal $X_{i0}(t)$ then remains in the same state until it again responds to a change of state by $X_{i1}(t)$.

In addition to the clock signal $C_r(t)$, the variation detector 3 requires as inputs all output signals of the state memory 2. The variation detector 3 then functions to generate the output signals $X^+_o(t)$, X $_o(t)$, and $X^-_o(t)$ of the invention in such a manner that:

1. A pulse of $C_r(t)$ is reproduced at $X^+_o(t)$ and X $21_o(t)$ during each period of $C_s(t)$ in which $$X_{i1}(t)\overline{X}_{i0}(t) = 1, \tag{5}$$

and only during each such period of $C_s(t)$.

2. A pulse of $C_r(t)$ is reproduced at $X^-_o(t)$ and X $21_o(t)$ during each period of $C_s(t)$ during which $$\overline{X}_{i1}(t)X_{i0}(t) = 1, \tag{6}$$

and only during each such period of $C_s(t)$.

The above description establishes a logical relationship between all signals appearing at interfaces of components of the invention.

Operation of Components

Internal construction of each component of the invention appears in FIG. 2. As shown, each component consists of appropriately connected standard logic elements. These logic elements are described briefly below.

A trigger is denoted by the symbol T with a unique identifying subscript: for example, $T_{101}$. As shown in FIG. 2, the inputs and outputs of trigger $T_{101}$ are denoted by the following symbols, either with or without the explicit indication of appropriate arguments:

$T_{T_{101}}$ = the triggering or control input, $R_{T_{101}}$ = the reference input, $T_{101}$ = the normal logical output, $\overline{T}_{101}$ = the complementary logical output.

The instantaneous value of each logical output is the complement of the other logical output. Trigger $T_{101}$, for example, converts the control input $T_{T_{101}}$ into logical outputs in accordance with the equation $$T_{101}(t)=\begin{cases}1, & T_{T_{101}}(t)\geq R_{T_{101}} \quad (7a)\\ 0, & T_{T_{101}}(t)<R_{T_{101}} \quad (7b)\end{cases}$$

A flip-flop is denoted by the symbol F with a unique identifying subscript: for example, $F_{201}$. As shown in FIG. 2, the inputs and outputs of flip-flop $F_{201}$ are denoted by the following symbols, either with or without the explicit indication of appropriate arguments:

$J_{F_{201}}$ = the set-enable input,
$T_{F_{201}}$ = the triggering or clock input,
$K_{F_{201}}$ = the reset-enable input, $F_{201}$ = the normal output,
$\overline{F}_{201}$ = the complementary output.

All flip-flops employed in the invention are of the clocked JK type (Montgomery Phister, Jr., Logical Design of Digital Computers, John Wiley and Sons, Inc., New York, 1959, pp. 128 – 129, 134 – 135). Such a flip-flop can assume either of two logical states. In the true (that is, 1) state, the normal output signal [$F_{201}(t)$, for example] and the complementary output signal [$\overline{F}_{201}(t)$, for example] assume the logical values 1 and 0, respectively. In the false (that is, 0) state, the normal and complementary output signals assume the logical values 0 and 1, respectively. A flip-flop is responsive to inputs at the J, K, and T terminals, but can change state only in response to a 1-to-0 transition of the input at the T terminal. For the flip-flop to actually change state at such a time, however, appropriate logical values must have been applied to the J and K terminals continuously during the preceding period of length no less than $\tau_e$. During that period, any one of four possible sets of logical values can be applied to the J and K terminals of the flip-flop. If a logical 0 is applied to both terminals, the flip-flop will not change state. If a logical 1 and 0 are applied to the J and K terminals, respectively, the flip-flop will change to or remain in the true state. If a logical 0 and 1, respectively, are applied to the J and K terminals, the flip-flop will change to or remain in the false state. If a logical 1 is applied to both the J and K terminals, respectively, the flip-flop will change state regardless of which state it may have been in.

A NAND-gate is denoted by the symbol G with a unique identifying subscript: for example, $G_{301}$. Such a gate generates a false logical output if, and only if, all of its inputs are true. The output of a NAND-gate is denoted by the same symbol as the gate itself, with the possible addition of an argument.

A logical inverter is denoted by the sumbol A with a unique identifying subscript: for example, $A_{301}$. An inverter generates an output which is the logical complement of its input. The output of an inverter is denoted by the same symbol as the inverter itself, with the possible addition of an argument.

Response delay is an important characteristic of any logic element. To comprehend the following discussion of the slope-sensitive synchronous digital level-crossing detector, it is sufficient to recognize that a flip-flop requires a short time to respond to each 1-to-0 transition at its T terminal and, therefore, changes state only after the trigger signal initiating the change is false.

Modes of Operation of Individual Components

The manner in which standard logic elements are combined to form each of the components shown in FIG. 2 will be described below. This description will be based largely upon equations which define the interconnections between the logic elements employed.

The means by which the clock 4 generates the signals $C_r(t)$ and $C_s(t)$ are fully described in a previously issued patent (C. E. Lenz, "Digital Reference Source," U.S. Pat. No. 3,378,692, issued Apr. 16, 1968). Consequently, reference to that patent will furnish all information necessary to understand operation of the clock 4, and no further explanation of that component is required here. It is desirable to understand the operation of this component first because it is utilized to synchronize the operation of other components.

As shown in FIG. 2, the binary converter 1 consists of trigger $T_{101}$, a fixed voltage source $E_{101}$, and a tapped potentiometer $R_{101}$ at whose adjustable contact potential $E_r$ appears. The connections of $T_{101}$ are defined by the following equations:

$$\left.\begin{array}{l} T_{T_{101}}(t)=e_i(t), \quad (8a)\\ R_{T_{101}}=E_r, \quad (8b)\end{array}\right\}\text{ Trigger } T_{101} \text{ input equations}$$

$$\left.\begin{array}{l} X_i(t)=T_{101}(t), \quad (9)\\ \overline{X}_i(t)=\overline{T}_{101}(t). \quad (10)\end{array}\right\}\text{ Binary converter 1 output equations}$$

As shown in FIG. 2, the state memory 2 consists of two flip-flops, $F_{201}$ and $F_{202}$. These flip-flops are connected to satisfy the equations below:

$$\left.\begin{array}{l} J_{F_{201}}(t)=X_i(t), \quad (11a)\\ T_{F_{201}}(t)=\underline{C}_r(t), \quad (11b)\\ K_{F_{201}}(t)=\overline{X}_i(t), \quad (11c)\end{array}\right\}\text{ Flip-flop } F_{201} \text{ input equations}$$

$$\left.\begin{array}{l} J_{F_{202}}(t)=F_{201}(t), \quad (12a)\\ T_{F_{202}}(t)=\underline{C}_s(t), \quad (12b)\\ K_{F_{202}}(t)=\overline{F}_{201}(t), \quad (12c)\end{array}\right\}\text{ Flip-flop } F_{202} \text{ input equations}$$

$$\left.\begin{array}{l} X_{i0}(t)=F_{202}(t), \quad (13)\\ \overline{X}_{i0}(t)=\overline{F}_{202}(t), \quad (14)\\ X_{i1}(t)=F_{201}(t), \quad (15)\\ \overline{X}_{i1}(t)=\overline{F}_{201}(t), \quad (16)\end{array}\right\}\text{ State memory 2 output equations}$$

As shown in FIG. 2, the variation detector 3 consists of the NAND-gates $G_{301}$, $G_{302}$, and $G_{303}$ in conjunction with the logical inverters $A_{301}$ and $A_{302}$. These logic elements are connected in accordance with the following equations:

$$\left.\begin{array}{l} G_{301}(t)=\overline{C_r(t)\overline{X}_{i0}(t)\overline{X}_{i1}(t)}, \quad (17)\\ G_{302}(t)=\overline{C_r(t)\overline{X}_{i0}(t)\overline{X}_{i1}(t)}, \quad (18)\\ G_{303}(t)=\overline{G_{301}(t)G_{302}(t)}, \quad (19)\end{array}\right\}\text{ Gate equations}$$

$$\left.\begin{array}{l} A_{301}(t)=\overline{G}_{301}(t), \quad (20)\\ A_{302}(t)=\overline{G}_{302}(t), \quad (21)\end{array}\right\}\text{ Inverter equations}$$

$$\left.\begin{array}{l} X_0^+(t)=A_{301}(t), \quad (22)\\ X_0^+(t)=G_{303}(t), \quad (23)\\ X_0^-(t)=A_{302}(t), \quad (24)\end{array}\right\}\text{ Variation detector 3 output equations.}$$

Relations 22 through 24 also constitute the output equations for the entire invention. Additional equations can now be written to express the outputs of the variation detector 3 as functions of the inputs to that component. Thus if equations 17 and 20 are substituted into equation 22, there results $$X^+_o(t)=C_r(t)\overline{X}_{i0}(t)X_{i1}(t). \quad (25)$$

Similarly, if equations 18 and 21 are substituted into equation 24, it follows that $$X^-_o(t) = C_r(t)X_{i0}(t)\overline{X}_{i1}(t). \qquad (26)$$

Finally, if equations 18, 19, and 20 are substituted into equation 23, there results $$X\ \ _o(t) = \overline{G_{301}(t)G_{302}(t)} = \overline{\overline{C_r(t)X_{i0}(t)X_{i1}(t)}\,\overline{C_r(t)X_{i0}(t)X_{i1}(t)}} = C_r(t)\overline{X}_{i0}(t)X_{i1}(t) + C_r(t)X_{i0}(t)\overline{X}_{i1}(t) = C_r(t)[\overline{X}_{i0}(t)X_{i1}(t) + X_{i0}(t)\overline{X}_{i1}(t)], \qquad (27)$$

where the fourth member of equation 27 results from application of De Morgan's theorem to the third member.

Therefore, the fourth means 3, includes, means A301 for providing an output therefrom of a first series of pulses spaced from each other, means for A302 for providing an output therefrom of a second series of pulses spaced from each other and positioned at intermediate locations on the time axis between said first series of pulses, and means G303 for providing an output therefrom of said first and second series of pulses.

Also, the third means 2, includes, means F201 for remembering the logic state of said at least one binary output at the time the trailing edge of the last pulse is inputted to said third means, and means F202 for remembering the logic state of said same at least one binary output at the time the trailing edge of the next to the last pulse is inputted to said third means.

Other functions of the fourth means 3, are provided by, means G301, G302 for comparing components of said at least one binary output produced by said third means; and means G303 for recognizing sets of said components wherein the logic states thereof differ from each other.

Modes of Operation of Components in Combination

The operation of all components of the invention in combination is demonstrated by the waveforms in FIG. 3. To display the versatility of the invention, the clock signals $C_r(t)$ and $C_s(t)$ are illustrated functioning initially in a single-phase mode and then in a two-phase mode. At first $C_r(t)$ and $C_s(t)$ are shown to be identical, a condition representing utilization of a single-phase clock. The signal $C_r(t)$ is then advanced by $(\tau/2)$ along the time axis at 5, thereby showing operation of the invention with a two-phase clock. The intervals during which single- and two-phase operation occur are indicated by the mode scale in FIG. 3.

An arbitrary analog input signal $e_i(t)$ is shown as a sine wave of unspecified period sufficient to permit each crossing of the reference level $E_r$ to be detected, of amplitude $E_i$, and of average value equal to the reference level $E_r$. The nature of this particular example of $e_i(t)$ is intended in no way to limit the class of signals to which the invention is responsive and is chosen solely to illustrate operation of the slope-sensitive synchronous digital level-crossing detector with a continuously varying input.

Response of the invention to a rise of the input signal $e_i(t)$ through the reference level $E_r$ will be illustrated first. The signal $e_i(t)$ is initially less than $E_r$ at 6. Consequently, the output $X_i(t)$ of the binary converter 1 and the outputs $X_{i1}(t)$ and $X_{i0}(t)$ of the state memory 2 are correspondingly false at 7, 8, and 9, respectively. When $e_i(t)$ rises to the level $E_r$ at 10, however, $X_i(t)$ responds immediately by going true at 11. In response to the next 1-to-0 transition of $C_s(t)$ at 12, $X_{i1}(t)$ then goes true at 13. Conditions are now such that equations 25 and 27 will be satisfied if $C_r(t)$ goes true while $X_{i1}(t)$ and $X_{i0}(t)$ remain in their current states. At 14, $C_r(t)$ does go true, thereby causing a complementary facsimile of the $C_r(t)$ pulse at 14 to appear in the gate output $G_{301}(t)$ at 15 in accordance with equation 17. Immediately, a facsimile of the $C_r(t)$ pulse at 14 appears in the output signals $X\ \ _o(t)$ and $X^+_o(t)$ at 16 and 17, respectively, thereby satisfying equations 25 and 27. No corresponding pulse appears at this time in $X^-_o(t)$ at 18. Consequently, the invention has responded in the required manner to an increase of $e_i(t)$ through the level $E_r$. In response to the 1-to-0 transition of $C_s(t)$ at 19, $X_{i0}(t)$ now goes true at 20, thereby preventing emission of additional pulses at $X\ \ _o(t)$ and $X^+_o(t)$ until after $X_i(t)$ again changes state.

The response of the invention to a decrease of the input signal $e_i(t)$ through the reference level $E_r$, an event which occurs at 21, will be illustrated next. The signal $X_i(t)$ again responds immediately by going false at 22. Consequently, in response to the 1-to-0 transition of $C_s(t)$ at 23, $X_{i1}(t)$ goes false at 24. When $C_r(t)$ goes true at 25, equation 18 is satisfied, thereby causing a complementary facsimile of the pulse 25 to appear in $G_{302}(t)$ at 26. As a consequence, both equations 26 and 27 are also satisfied, causing facsimiles of the pulse 25 to appear in $X\ \ _o(t)$ at 27 and in $X^-_o(t)$ at 28. Because no pulse appears in $X^+_o(t)$ at 29, the invention has responded properly to a decrease of the input signal $e_i(t)$ through the reference level $E_r$. The 1-to-0 transition of $C_s(t)$ at 30 now causes $X_{i0}(t)$ to go false at 31, thereby preventing further emission of pulses at $X\ \ _o(t)$ and $X^-_o(t)$ until after $X_i(t)$ again changes state. The invention now continues to operate in the manner described in this and the preceding paragraph, responding to each traversal of the level $E_r$ by $e_i(t)$.

When the phase of $C_r(t)$ is advanced at 5, $X_{i1}(t)$ and $X_{i0}(t)$ continue to respond to $X_i(t)$ and $C_s(t)$ in the same manner as before. However, the timing of the output pulses appearing at $X^+_o(t)$, $X\ \ _o(t)$, and $X^+_o(t)$ is now shifted so that these pulses continue to correspond with selected $C_r(t)$ pulses. Thus when $X_{i1}(t)$ is true at 32 while $X_{i0}(t)$ is false at 33, a complementary facsimile of the $C_r(t)$ pulse at 34 appears in $G_{301}(t)$ at 35. Similarly, facsimiles of the pulse 34 appear in X 21$_o(t)$ at 36 and in $X^+_o(t)$ at 37. Again, when $X_{i1}(t)$ is false at 38 while $X_{i0}(t)$ remains true at 39, a complementary facsimile of the $C_r(t)$ pulse at 40 appears in $G_{302}(t)$ at 41. A facsimile of the pulse at 40 also appears in $X\ \ _o(t)$ at 42 and in $X^-_o(t)$ at 43. Operation of the invention then continues in the manner just described.

An alternative arbitrary discrete input signal, $e_i(t)$, is shown at 44 to demonstrate the versatility of the invention. This signal varies between a level $E_{i1}$ which is less than $E_r$ and a level $E_{i2}$ which is greater than $E_r$. The significance of this second example of $e_i(t)$ at 44 is that the invention will respond to the signal at 44 in exactly the same manner as it responds to the analog example of $e_i(t)$ at 6.

Special-Purpose Simplification of the System

Referring to FIG. 2 the versatility of the invention is demonstrated further by observing that the variation detector 3 can be simplified to detect $e_i(t)$ crossings of $E_r$ either only when $e_i(t)$ is rising, only when $e_i(t)$ is decreasing, only when the slope of $e_i(t)$ is unimportant, or when any combination of two of the preceding functions is required. The particular logic elements necessary in the variation detector 3 under each of these conditions is shown in the table below, denoted by an X, wherever the logic elements in FIG. 2 are required to provide the indicated output signals.

TABLE

[Table showing variation detector 3 components necessary to satisfy specified output requirements]

| Outputs required | | | Logic elements necessary | | | | |
|---|---|---|---|---|---|---|---|
| | | | Gates | | | Inverters | |
| $X_o^+(t)$ | $X_o^+(t)$ | $X_o^-(t)$ | $G_{301}$ | $G_{302}$ | $G_{303}$ | $A_{301}$ | $A_{302}$ |
| X | X | X | X | X | X | X | X |
| X | X | | X | X | X | X | |
| | X | X | X | X | X | | X |
| X | | X | X | X | | X | X |
| X | | | X | | | X | |
| | X | | X | X | X | | |
| | | X | | X | | | X |

I claim:

1. A slope responsive signal identification means excited by at least one input signal, comprising in combination:

first means for quantizing said at least one input signal including means for converting a control input signal into binary logical output signals, said means for converting being responsive to analog, binary and discrete signals and providing at least one binary output therefrom;

second means for providing at least one clock pulse therefrom;

third means comprising multiple flip-flop circuits responsive to the first and second means for providing memorization of the state of logic of said at least one binary output, each of the multiple flip-flop circuits being responsive to said first and second means and assuming either of two logical states; and fourth means, responsive to the second and third means for identification of the slopes of said at least one input signal, comprising a first auxiliary means comprising a plurality of NAND gates activated by said multiple flip-flop circuits and by said second means for comparing components of said at least one binary output and further comprising a second auxiliary means comprising an additional NAND gate activated by the plurality of NAND gates for recognizing sets of components of said at least one binary output wherein the logic states thereof differ from each other, whereby pulses corresponding to positive-going transitions, negative-going transitions or combinations of said pulses are outputted therefrom.

2. The apparatus as stated in claim 1, wherein said fourth means includes:

means for providing an output therefrom of a first series of pulses spaced from each other;

means for providing an output therefrom of a second series of pulses spaced from each other and positioned at intermediate locations on the time axis between said first series of pulses; and means for providing an output therefrom of said first and second series of pulses.

3. The apparatus as stated in claim 1, wherein said third means includes:

means for remembering the logic state of said at least one binary output at the time the trailing edge of the last pulse is inputted to said third means; and means for remembering the logic state of said same at least one binary output at the time the trailing edge of the next to the last pulse is inputted to said third means.

4. The apparatus as stated in claim 1, wherein:

said first means has an output which is responsive to the difference in amplitude between an arbitrary input signal of said at least one input signal and a reference signal imputted to said first means.

5. The apparatus as stated in claim 1, wherein:

identification of said either of the slope polarities is independent of the magnitude and polarity of said input signal.

6. The apparatus as stated in claim 1:

said apparatus being insensitive to the sense and the average of the algebraic magnitude of the input signal.

7. The apparatus as stated in claim 1:

said apparatus providing untruncated outputs from said fourth means.

8. The apparatus as stated in claim 1:

said fourth means provides outputs which have substantially the same shapes as said at least one clock pulse and are synchronized therewith.

9. A slope-responsive signal means, comprising:

a quantizer for providing at least one binary signal output converted from at least one arbitrary input signal, said quantizer including means for converting a control input signal into binary logical output signals, said means for converting being responsive to analog, binary and discrete signals;

a clock-pulse means for providing an output of at least one of a plurality of clock pulses;

a signal-state-memory means comprising multiple flip-flop circuits responsive to the outputs of the quantizer and the clock-pulse means for remembering and providing an output thereof of at least a first component of the binary signal occurring in time between the trailing edge of one of the clock pulses last inputted and the trailing edge of one of the clock pulses occurring prior to the last clock pulse, and a second component of the binary signal occurring in time between the trailing edge of the prior clock pulse and the trailing edge of the clock pulse preceding the prior clock pulse, each of the multiple flip-flop circuits being responsive to said first and second means and assuming either of two logical states; and a slope polarity means responsive to the output of the signal-state memory means and the clock pulse means comprising a first auxiliary means comprising a plurality of NAND gates activated by said multiple flip-flop circuits and by said second means for comparing components of said at least one binary output produced by said third means and further comprising a second auxiliary means comprising an additional NAND gate for recognizing sets of said components wherein the logic states thereof differ from each other, whereby pulses corresponding to positive-going transitions, negative-going transitions or combinations of said pulses are outputted therefrom.

* * * * *